United States Patent [19]
Kumagai et al.

[11] Patent Number: 5,608,525
[45] Date of Patent: Mar. 4, 1997

[54] PHASE ADJUSTABLE OPTICAL FIBER GYRO USING BOTH EVEN ORDER HARMONICS AND AN ORTHOGONAL COMPONENT OF AN EVEN-ORDER HARMONIC

[75] Inventors: Tatsuya Kumagai; Keiji Abe; Munehiro Akiyama; Hiroshi Kajioka; Hisao Sonobe; Shigeru Oho, all of Ibaraki, Japan

[73] Assignee: Hitachi Cable, Ltd., Tokyo, Japan

[21] Appl. No.: 404,817

[22] Filed: Mar. 14, 1995

[30] Foreign Application Priority Data

Mar. 14, 1994 [JP] Japan .................................. 6-042243
Mar. 30, 1994 [JP] Japan .................................. 6-060678

[51] Int. Cl.⁶ .................................................. G01C 19/72
[52] U.S. Cl. ................................................... 356/350
[58] Field of Search ....................................... 356/350

[56] References Cited

U.S. PATENT DOCUMENTS

4,883,358  11/1989  Okada ..................................... 356/350
5,459,575  10/1995  Malvern .................................. 356/350

*Primary Examiner*—Samuel A. Turner
*Attorney, Agent, or Firm*—Lowe, Price, LeBlanc & Becker

[57] ABSTRACT

A photodetector generates an electric signal by receiving a light signal which is obtained by coupling lights having propagated through an optical fiber sensing loop in clockwise and counter clock-wise directions, and modulated in a phase modulator. The electric signal is detected in a synchronous detection circuit to generate a fundamental wave component of the phase modulation signal, a duplicate harmonic wave component, a quadruple harmonic wave component, and an orthogonal component which is obtained in accordance with a phase shift of the quadruple harmonic wave component by one quarter period.

7 Claims, 10 Drawing Sheets

PHASE ADJUSTABLE OPTICAL FIBER GYRO USING BOTH EVEN ORDER HARMONICS AND AN ORTHOGONAL COMPONENT OF AN EVEN-ORDER HARMONIC

FIELD OF THE INVENTION

This invention relates to an optical fiber gyro, and more particularly to, the improvement on an optical fiber gyro having a constantly phase-adjusting function.

BACKGROUND OF THE INVENTION

An optical fiber gyro using an optical fiber which detects an angular velocity of a rotating member is widely used to control a car or vehicle body. In an optical fiber gyro using the phase modulation system, a light supplied from a light source is divided into two lights by an optical coupler and the two lights are shifted in phase to be supplied to an optical fiber sensing loop by a phase modulator. Then, the lights which are propagated through the sensing loop in the clock and counter clock-wise directions are coupled to be supplied to an optical detector by the optical coupler. In the optical detector, an electric signal is generated from the received light to detect an angular velocity of the sensing loop. Thus, a displacement angle of the optical fiber gyro is detected in accordance with the angular velocity.

The optical fiber gyro comprises a signal processing circuit which comprises a synchronous detector, an analog to digital (A/D) converter, a CPU (Central Processing Unit), and an oscillator.

In calculating an angular velocity, a sine-wave signal having a frequency fm is applied to the phase modulator by the oscillator. Thus, the clock-wise and counter clock-wise direction lights are phase-modulated in the sensing loop. As described before, an electric signal is generated in the optical detector. The electric signal comprises a DC component, a component of the phase-modulation frequency, and components of high harmonic waves to be supplied to the synchronous detector.

Here, the equation (1) is defined.

$$P = P_L + P_R + 2\sqrt{P_L \cdot P_R} \quad \cdot \tag{1}$$

$$\cos(\phi s + m \cdot \cos 2\pi fmt) = P_L + P_R + 2\sqrt{P_L \cdot P_R} \quad \cdot$$

$$J_0(m)\cos\phi s - 4\sqrt{P_L \cdot P_R} \quad \cdot J_1(m)\sin\phi s \cdot$$

$$\cos(2\pi fmt) - 4\sqrt{P_L \cdot P_R} \quad \cdot J_2(m)\cos\phi s \cdot$$

$$\cos(2\pi \cdot 2fmt) + 4\sqrt{P_L \cdot P_R} \quad \cdot J_3(m)\sin\phi s \cdot$$

$$\cos(2\pi \cdot 3fmt) + 4\sqrt{P_L \cdot P_R} \quad \cdot J_4(m)\cos\phi s \cdot$$

$$\cos(2\pi \cdot 4fmt)$$

where P is an instantaneous output of the electric signal, $P_L$ and $P_R$ are outputs of the clock-wise and counter clock-wise direction lights, m is a phase-modulation degree, $J_0(m)$ to $J_\phi(m)$ are Bessel functions having a factor of m, and $\phi$, is a Sagnac phase difference.

Each frequency component is synchronously detected in the synchronous detector to be converted from analog value to digital value in the A/D converter. Then, the digital values of each frequency component are supplied to the CPU, in which an angular velocity $\Omega$ is calculated.

Where the synchronous detector comprises a switch which is turned on and off by a synchronous signal having a predetermined frequency, and an output voltage obtained from a low-pass filter which is included in the synchronous detector will be a maximum value at the time when an input signal supplied to the synchronous detector is coincident in phase with the synchronous signal. On the other hand, when the input signal is not coincident in phase with the synchronous signal to provide a phase difference $\Delta\theta$, the output signal will not be the maximum value, while an error occurs in the output signal.

The equations (2) to (4) represent errors generated in the fundamental wave component $S_1$, the duplicate wave component $S_3$, and the quadruple wave component $S_4$ in accordance with the phase difference $\Delta\theta$.

$$S_1 = K \cdot J_1(m) \sin \phi s \cdot \cos \Delta\theta \tag{2}$$

$$S_2 = K \cdot J_2(m) \cos \phi s \cdot \cos (2 \cdot \Delta\theta) \tag{3}$$

$$S_4 = K \cdot J_4(m) \cos \phi s \cdot \cos (4 \cdot \Delta\theta) \tag{4}$$

where K is a constant which is determined by a light output and an amplification factor in an electric circuit.

In the conventional optical fiber gyro, an error occurs in the calculation of an angular velocity $\Omega$, if an error caused by the phase differences $\Delta\theta$ is included in an output signal of the synchronous detector. Therefore, it is required to make the error caused by the phase difference a $\Delta\theta$ zero, so that the precision becomes high in measuring an angular velocity $\Omega$.

In order to make the error zero, a synchronous detection circuit using two-phase synchronous signals comprising two signals of the same frequency and a different phase of $\pi/2$ (one quarter period) is adopted to detect a fundamental wave signal $S_1'$ as defined by the equation (5).

$$S_1' = K \cdot J_1(m) \sin \phi s \cdot \sin \Delta\theta \tag{5}$$

Then, a calculation is carried out as defined by the equation (6).

$$S = \sqrt{S_1^3 + S_1'^3} \tag{6}$$

On the other hand, a phase of a synchronous signal is adjusted in a phase-adjusting apparatus using a one-phase synchronous signal by delaying a phase of the synchronous signal via a delay circuit. In this phase-adjusting apparatus, a phase is adjusted to maximize a fundamental wave signal.

In the conventional phase-adjusting apparatus in the optical fiber gyro, however, there are disadvantages as described below.

(1) When the synchronous detection circuit using the two-phase synchronous signals is adopted, high harmonic wave components are included in the synchronously detected signal, as seen in the equations (2) and (6) by $\sin\Delta\theta$ and $\cos\Delta\theta$, so that an output error can not be completely eliminated.

(2) When the synchronous detection circuit using the two-phase synchronous signals is adopted, the scale of the synchronous detection circuit becomes twice to result in the enlargement of the size, and the cost thereof becomes high.

(3) When a phase of a synchronous signal is adjusted to maximize a synchronously detected signal, an output signal varies at the time when any rotation is applied to the sensing hoop, as apparent from the equations (2) to (4). Therefore, it is necessary for the sensing loop to be static in adjusting the phase of the input signal. This means that the phase adjustment is impossible to be carried out in operation of the optical fiber gyro.

(4) Even if the synchronous detection circuit using the two-phase synchronous signals ie adopted, a phase-adjusting circuit becomes necessary to some extent, because any rotation is detected in accordance with positiveness and negativeness of fundamental wave signals.

SUMMARY OF THE INVENTION

Accordingly, it is an object of the invention to provide an optical fiber gyro in which the scale of circuits becomes small.

It is a further object of the invention to provide an optical fiber gyro in which the size of a whole structure becomes small.

It is a still further object of the invention to provide an optical fiber gyro which is fabricated by a low cost.

It is a yet still further object of the invention to provide an optical fiber gyro in which a high precision is obtained in detecting an angular velocity. It ie another object of the invention to provide an optical fiber gyro in which a phase of a synchronous signal supplied to a synchronous detection circuit is adjusted in operation of the optical fiber gyro.

According to the first feature of the invention, an optical fiber gyro, comprises:

an optical fiber sensing loop for propagating lights in a clock-wise direction and a counter clock-wise direction;

a phase modulator for modulating phases of the lights propagated through the optical fiber sensing loop;

an optical coupler for coupling the lights having propagated through the optical fiber sensing loop to provide a coupled light;

a photodetector for generating an electric signal responsive to the coupled light;

a synchronous detection circuit for detecting said electric signal to provide a detected output, the detected output comprising a fundamental wave component of a phase modulation signal supplied to the phase modulator, an even-number order harmonic waive component, and an orthogonal component obtained in accordance with a shift of the even-number order harmonic wave component by a phase of one quarter period; and means for adjusting a phase relation of the fundamental wave, even-number order harmonic wave, and orthogonal wave components and the phase modulation signal to make a level of the orthogonal wave component zero, and maintaining a mutual phase relation of the fundamental wave, even-number order harmonic wave, and orthogonal wave components to be a predetermined mutual phase relation.

According to the second feature of the invention, an optical fiber gyro, comprises:

an optical fiber sensing loop for propagating lights in a click-wise direction and a counter clockwise direction;

a phase modulator for modulating phases of the lights propagated through the optical fiber sensing loop by receiving a phase modulation signal;

an optical coupler for coupling the lights having propagated through the optical fiber sensing loop to provide a coupled light;

a photodetector for generating an electric signal responsive to the coupled light;

a first synchronous detection circuit for detecting a fundamental wave component of the phase modulation signal by receiving the electric signal;

a second synchronous detection circuit for detecting a duplicate harmonic wave component by receiving the electric signal;

a third synchronous detection circuit for detecting a quadruple harmonic wave component by receiving the electric signal;

a signal generator for generating synchronous signals used for detections in the first to third synchronous detection circuits, and the phase modulation signal to drive the phase modulator; and a CPU for calculating a rotative angular velocity of the optical fiber sensing loop in accordance with at least one of output signals of the first to third synchronous detection circuits;

wherein the CPU controls the signal generator to shift a phase of the phase modulation signal, thereby making a level of the duplicate harmonic wave component zero, and to subsequently shift the phase of the phase modulation signal in a positive output direction of the duplicate harmonic wave component by one quarter wavelength of the duplicate harmonic wave component.

BRIEF DESCRIPTION OF THE DRAWINGS

The invention will be explained in more detail in conjunction with appended drawings, wherein.

DESCRIPTION OF THE PREFERRED EMBODIMENTS

Before explaining an optical fiber gyro in the preferred embodiments according to the invention, the aforementioned conventional optical fiber gyro will be explained in FIG. 1.

The conventional optical fiber gyro comprises an optical unit 12 and a signal processing unit 13. The optical unit 12 comprises a light source 1 for emitting a light, an optical coupler 2a for coupling lights to provide a coupled light and decoupling a light to provide decoupled lights, a polarizer 3 for polarizing a light to provide a polarized light, an optical coupler 2b for dividing the polarized light into two lights, a phase modulator 4 for modulating lights in phase, an optical fiber sensing loop 5 for propagating the lights in the clockwise and counter clock-wise directions, a light detector 6 for detecting a light supplied from the optical coupler 2a, and a pre-amplifier 7 for amplifying an electric signal supplied from the light detector 6. The signal processing unit 13 comprises a synchronous detection circuit 8 for separating fundamental, duplicate and quadruple harmonic wave components S1, S2, and S4 of a phase modulation frequency used in the phase modulator 4, an analog to digital (A/D) converter 9 for converting the signals supplied from the synchronous detection circuit 8 from analog to digital, a CPU (central processing unit) 10 for calculating an angular velocity by receiving the digital signals from the A/D converter 9, and an oscillator 11 for providing the phase modulator 4 and the synchronous detection circuit 8 with an oscillation signal in accordance with the control of the CPU 10.

In operation, a light emitted from the light source 1 is branched by the optical coupler 2a, and one of the branched lights is polarized in the polarizer 3. A light polarized in the polarizer 3 branched by the optical coupler 2b, and one of the branched lights is modulated in phase to be propagated through the sensing loop 5 in the counter clock-wise direction by the phase modulator 4, while the remaining one of the branched lights is propagated through the sensing loop 5 in the clock-wise direction, and then modulated in phase by the phase modulator 4. In the phase modulator 4, a sine-wave signal applied from the oscillator 11 generates a constant phase bias for the lights passed therethrough. The lights propagated through the sensing loop 5 are coupled by the optical coupler 2b, and the coupled light is supplied via the polarizer 3 and the optical coupler 2a to the light detector 6. When the sensing loop 5 is rotated to generate a rotative angular velocity, a phase difference occurs between the clock-wise and counter clock-wise direction propagated lights, so that a light received by the light detector 6 changes dependent on the phase difference. The light detector 6 generates an electric signal which is then amplified in the pre-amplifier 7, and the amplified signal is detected in the synchronous detection circuit 8 to separate a fundamental wave component S1, a duplicate harmonic wave component S2, and a quadruple harmonic wave component S4 of a phase modulation frequency used in the phase modulator 4. The fundamental wave component S1, the duplicate harmonic wave component S2, and the quadruple harmonic wave component S4 are digitalized in the A/D converter 9 to be supplied to the CPU 10, in which an angular velocity is calculated in accordance with the equations (2) to (6), as explained before.

Figure 2:
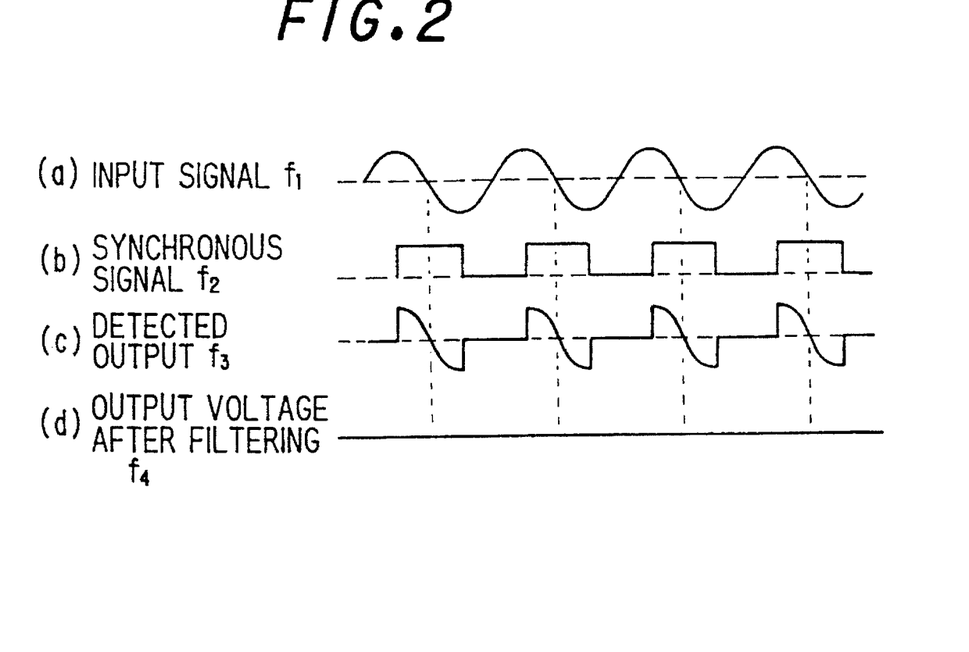
FIGS. 2 and 3 are waveform diagrams showing an input signal $f_1$ a synchronous signal $f_2$, a detected output $f_3$ and an output voltage $f_4$ in a synchronous detection circuit in the conventional optical fiber gyro.

FIG. 2 shows an input signal having a frequency of $f_1$ supplied to the synchronous detection circuit 8, a synchronous signal $f_2$ for turning a switch on and off in the synchronous detection circuit 8, a detected output $f_3$, and an output voltage $f_4$ obtained by filtering the detected output $f_3$ by using a low-pace filter (not shown), wherein the input signal $f_1$ and the synchronous signal $f_4$ have a phase difference of $\pi/2$ (90 degrees) therebetween.

Figure 3:
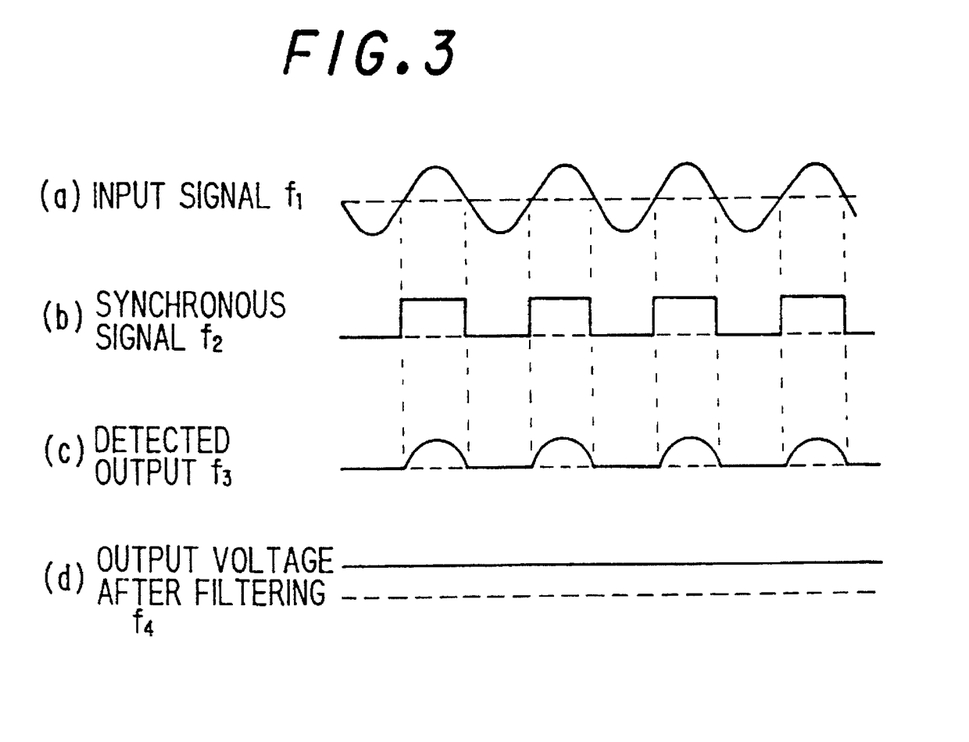

FIG. 3 shows the input signal $f_1$, the synchronous signal $f_2$, the detected output $f_3$, and the output voltage $f_4$, wherein the input signal $f_1$ and the synchronous signal $f_1$ are coincident in phase with each other.

The output voltage $f_4$ is zero in FIG. 2, while the output voltage $f_4$ is maximum in FIG. 3.

In the optical fiber gyro, the phase modulator 4 enhances a precision in detecting a rotative angular velocity in accordance with the application of a phase difference of approximately $\pi/2$ on the propagating lights in the clock-wise and counter clock-wise directions, and, if a phase of the synchronous signal $f_2$ is deviated even with a small amount, a linearity of sensing a rotative angular velocity will be deteriorated. This is a reason why the phase-adjustment of the synchronous signal $f_2$ is necessary in the optical fiber gyro.

Next, an optical fiber gyro in the first preferred embodiment according to the invention will be explained in FIG. 4, wherein like parts are indicated by like reference numerals as used in FIG. 1. The optical fiber gyro comprises an optical unit 12 which is the same as explained in FIG. 1, and a signal processing circuit 13 which is improved in invention. The signal processing unit 13 comprises a programmable timer 14 for generating a clock of an arbitrary frequency by dividing a reference clock, a flip-flop 15 operating in response to the clock from the programmable timer 14 to generate a synchronous signal, first to fourth synchronous detection circuits 81 to 84 for synchronously detecting a signal supplied from a pre-amplifier 7 in accordance with the switching-on and off by receiving the synchronous signal from the flip-flop 15, a shiftregister 17 for phase-shifting the synchronous signal supplied from the flip-flop 15 by receiving a shift clock, and a multiplexer 16 for selecting one of outputs of the first to fourth synchronous detection circuits 81 to 84. The signal processing circuit 13 further comprises an A/D converter 9, a CPU 10, and a filter 18.

Each of the synchronous detection circuits 81 to 84 carries out the synchronous detection of an input signal in accordance with the synchronous signal supplied from the flip-flop 15.

In this optical fiber gyro, the first to fourth synchronous detection circuits 81 to 84 provide a fundamental wave synchronous detection circuit, an even-number order harmonic wave synchronous detection circuit, and an orthogonal component detection circuit, and the timer 14, the flit-flop 15, the shift register 17, and the CPU 10 provide means for adjusting a phase of the synchronous detection circuit and a phase of the phase modulator 4.

A phase modulation signal fm which is one of ON and OFF signals generated in the flip-flop 15 is varied in phase to be supplied to the phase modulator 4 by re-writing data supplied from the CPU 10 to the timer 14 or the shift register 17. When the data supplied to the timer 14 is re-written, a phase thereof is coarsely varied in the range of 360° (any phase angle in one period), and, if the data supplied to the shift register 17 is re-written, the phase is finely varied.

Figure 5:
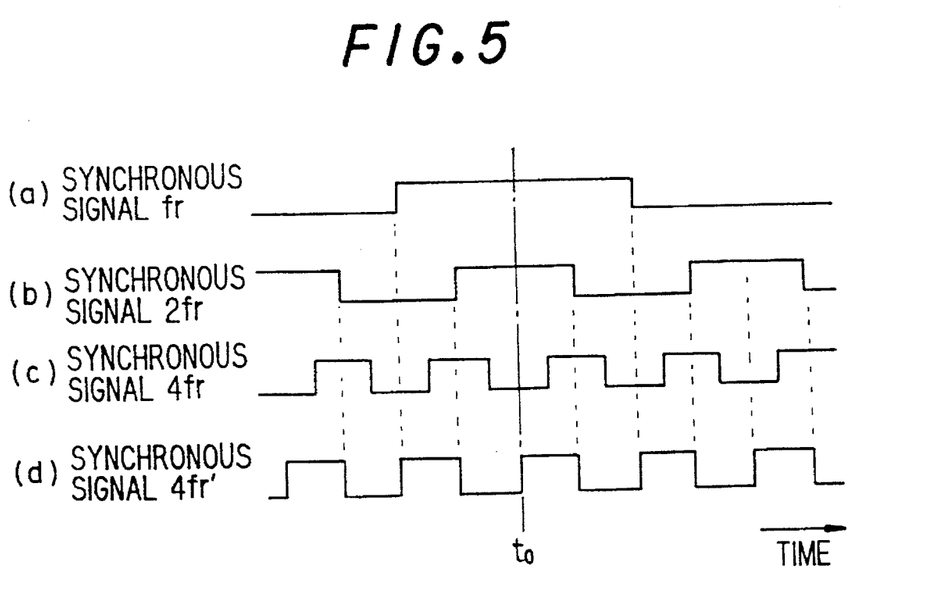
FIG. 5 is a waveform diagram showing synchronous signals $f_r$, $2f_r$, $4f_r$, and $4f'_r$ supplied to synchronous detection circuits in the optical fiber gyro in the first preferred embodiment.

First to fourth synchronous signals which are four signals of the ON and OFF signals generated in the flip-flop 15 are set to have frequencies of a fundamental wave, duplicate harmonic wave and quadruple harmonic waves relative to a frequency of the phase modulation signal fm. The synchronous signals of the quadruple harmonic wave are of two phases, one of which has a phase difference of 90° (one quarter period) relative to the other. Hereinafter, the first one is defined as "In-phase component synchronous signal", and the second one as "Orthogonal component synchronous signal". FIG. 5 shows the fundamental wave synchronous signal fr, the duplicate harmonic wave synchronous signal 2fr, the quadruple harmonic wave in-phase component synchronous signal 4fr, and the quadruple harmonic wave orthogonal component synchronous signal 4fr' which have a phase-relation shown therein, wherein the signals fr, fr and 4fr are symmetrical relative to a timing $t_o$, at which the signals 2fr and 2fr are at ON state, while the signal 4fr is at OFF state, and the signal 4fr' is changed OFF to ON at the timing $t_o$.

In the first preferred embodiment, the phase-relation of the synchronous signals fr, 2fr, 4fr and 4fr' as shown in FIG. 5 is fixed, and a phase of the phase modulation signal fm is varied by re-writing the data supplied to the timer 14 and the shit register 17.

In operation, the CPU 10 monitors a duplicate harmonic wave-detected output supplied from the second synchronous detection circuit 82 via the multiplexer 16 to the A/D converter 9 to re-write the data supplied to the timer 14, so that a phase of the phase modulation signal fm is coarsely shifted to make the duplicate harmonic wave-detected output zero. Next, the CPU 10 monitors a quadruple harmonic wave in-phase component-detected output in the same manner to re-write the data supplied to the timer 14, so that the phase of the phase modulation signal fm is coarsely shifted to make the quadruple harmonic wave in-phase component-detected output zero. Then, the CPU 10 monitors a quadruple harmonic wave orthogonal component-detected output in the same manner to rewrite the data supplied to the shift register 17, so that the phase of the phase modulation signal fm is finely shifted to make the quadruple harmonic wave orthogonal component-detected output zero. This sequential procedure is carried out under the control of the CPU 10 having a predetermined program stored in a ROM (not shown).

Thus, the quadruple harmonic wave orthogonal component detected output is controlled to be zero. This means that $\Delta\theta$ becomes zero in the equation (5). Consequently, the values obtained in the equations (2) to (4) become maximum. The CPU 10 constantly controls the timer 14 and the shift register 17 to carry out the above described phase adjustment, so that the equations (2) to (4) provide the maximum values.

In more specifically, when a frequency of the phase modulation signal fm is several tens KHz, and a frequency of the reference clock supplied timer 14 is 10 MHz, the coarse phase adjustment of less than 4 degrees can be carried out for a quadruple harmonic wave. On the other hand, when a frequency of the shift clock supplied to the shift register 17 is 48 MHz, the fine phase adjustment of less than 1 degree can be carried out for a quadruple harmonic wave. Consequently, the optical fiber gyro is enhanced in precision and reliability in the first preferred embodiment.

As explained above, it is preferable that the phase adjustment and synchronous signals for the synchronous detection are supplied from a common oscillation source oscillating with a high frequency to simply and precisely adjust phases in the phase modulation and the synchronous detection. Practically, a reference clock is generated, and a frequency of the reference clock ie divided to provide a phase modulation signal and synchronous signals. The division of the reference clock is advantageously carried out in the programmable timer 14 which is programmed by the CPU 10, so that an arbitrary frequency of a clock is obtained at an arbitrary phase. In this programmable timer 14, clocks of fundamental wave, an even-number Order harmonic wave, and an even-number order harm.onto wave which is shifted in phase by one quarter period are obtained. The shift register 17 delays the clock of the fundamental wave with a shift amount equal to a value obtained by multiplying a shift clock by a constant number in multiplying the clock of the fundamental wave to the phase modulator 4. Thus, a phase relation between the phase modulation signal and each synchronous signal is determined dependently on a mutual phase relation between fundamental waves for the phase modulation and the synchronous detection generated in the programmable timer 14, and a phase delayed in the shift register 17. This phase relation is arbitrarily adjusted by seating a shift amount for the shift register 17 and a program for the timer 14 by the CPU 10. For the purpose, the CPU 10 monitors an output of each synchronous detection circuit 81 to 84, so that the phase adjustment is carried out to make the orthogonal component of the detected outputs zero.

As apparent from the equations (2) to (4), a phase adjustment precision depends on a scale of an optical fiber gyro, wherein a scale error $\epsilon$ is approximately estimated by the highest order harmonic wave synchronously detected. In case where the highest order harmonic wave is a quadruple harmonic wave, the equation (7) is defined.

$$\epsilon\{1-\cos(4\cdot\theta)\}\times 100 \, [\%] \tag{7}$$

In order to fabricate an optical fiber gyro having a scale error of less than 0.1%, a phase adjustment precision of less than at least 0.6° is required.

Figure 1:
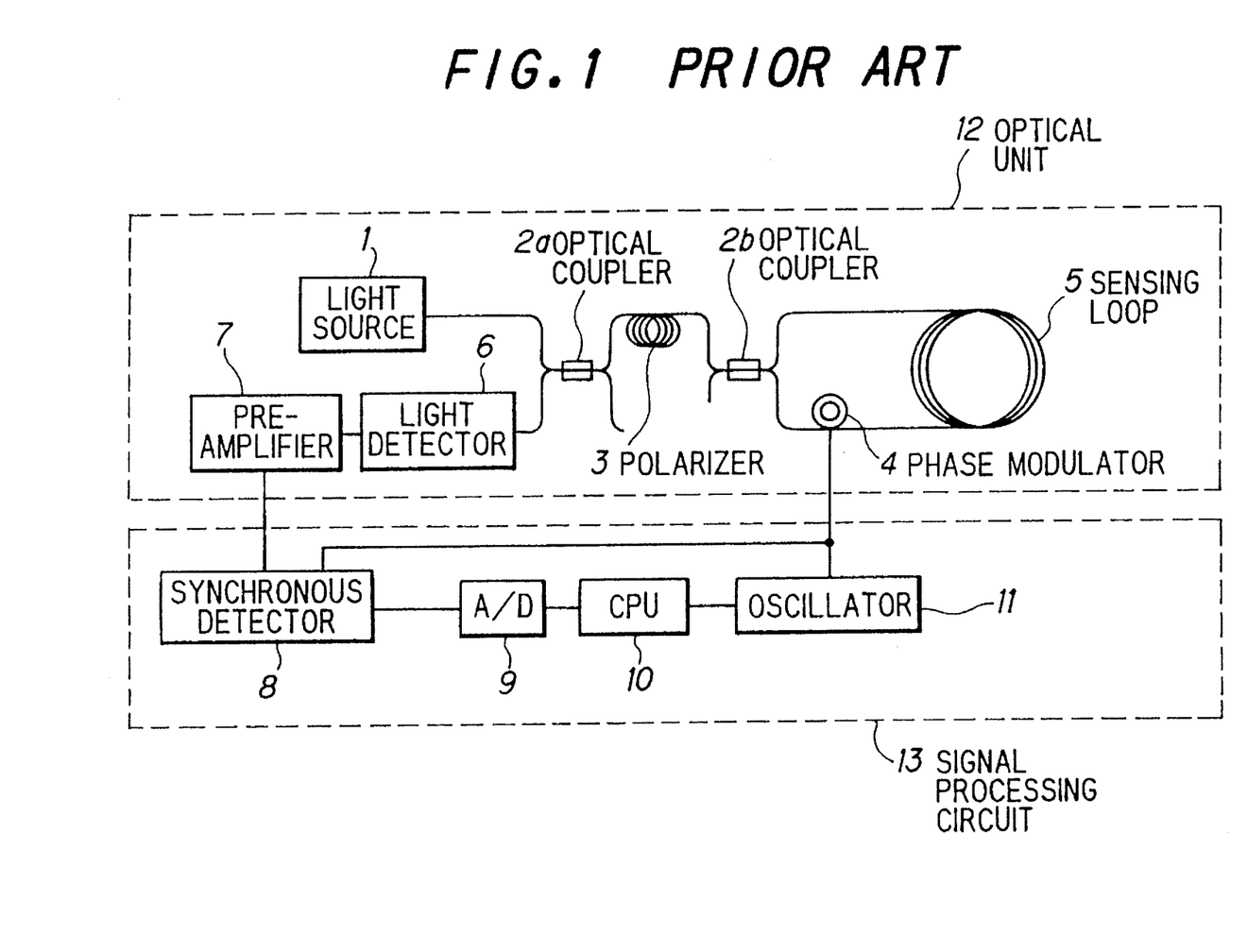
FIG. 1 is a block diagram showing a conventional optical fiber gyro.
Figure 4:
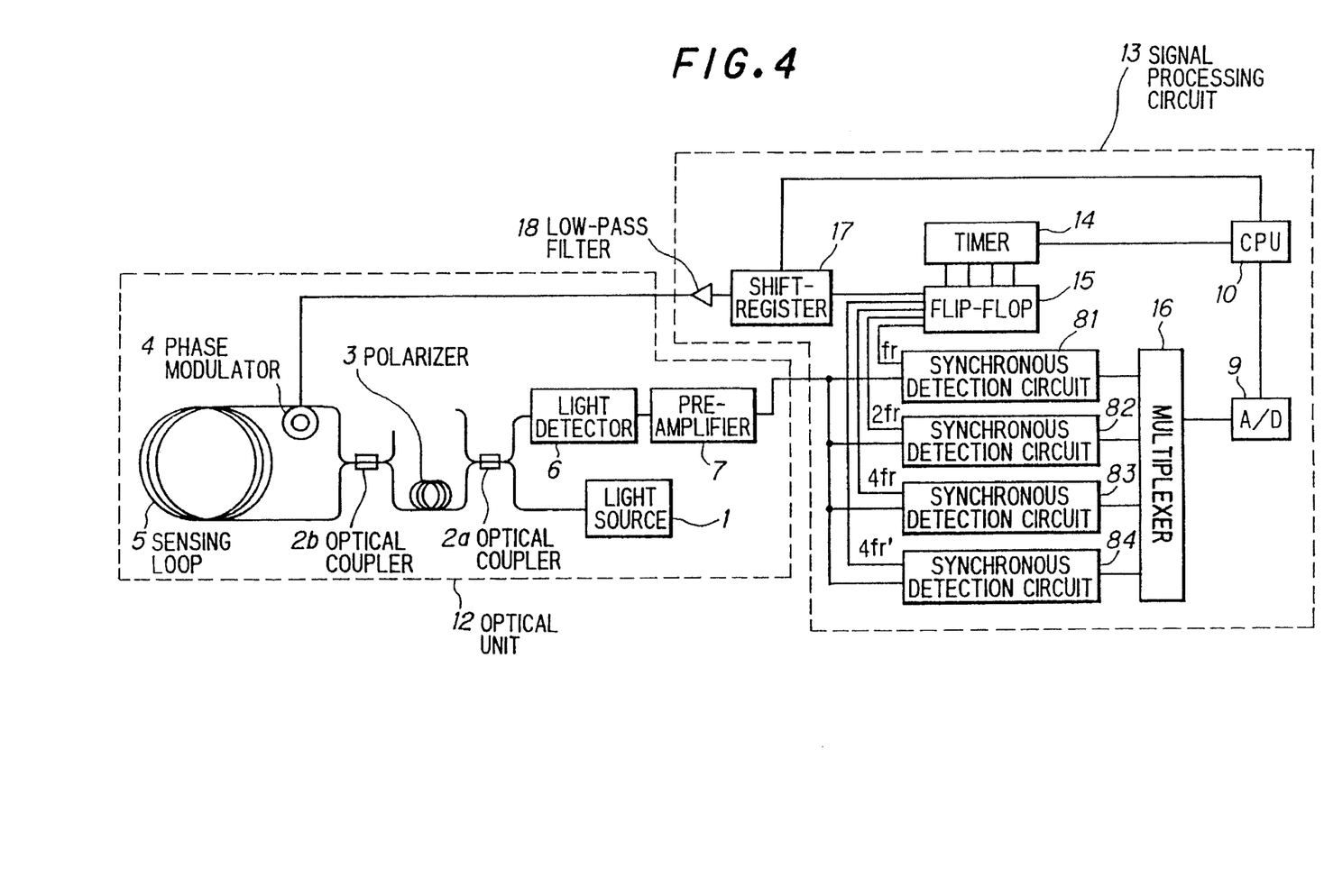
FIG. 4 is a block diagram showing an optical fiber gyro in a first preferred embodiment according to the invention.
Figure 6A:
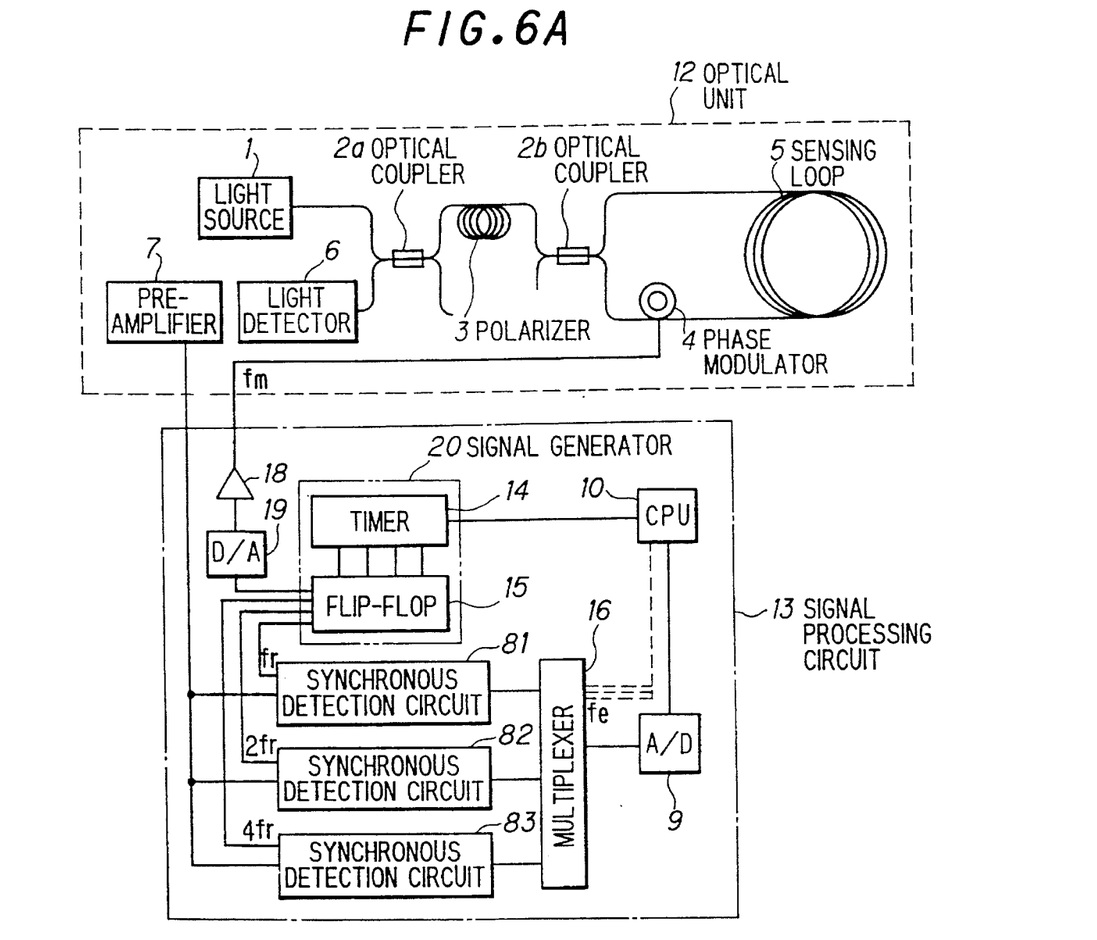
FIG. 6A is a block diagram showing an optical fiber gyro in a second preferred embodiment according to the invention.

FIG. 6A shows an optical fiber gyro in the second preferred embodiment according to the invention, wherein like parts are indicated by like reference numeral as used in FIGS. 1 and 4.

In the second preferred embodiment, a programmable timer 14 and a flip-flop 15 are represented as a signal generator 20, and a D/A converter 19 is further included, while a shift register 17 (FIG. 4) is deleted.

Figure 6B:
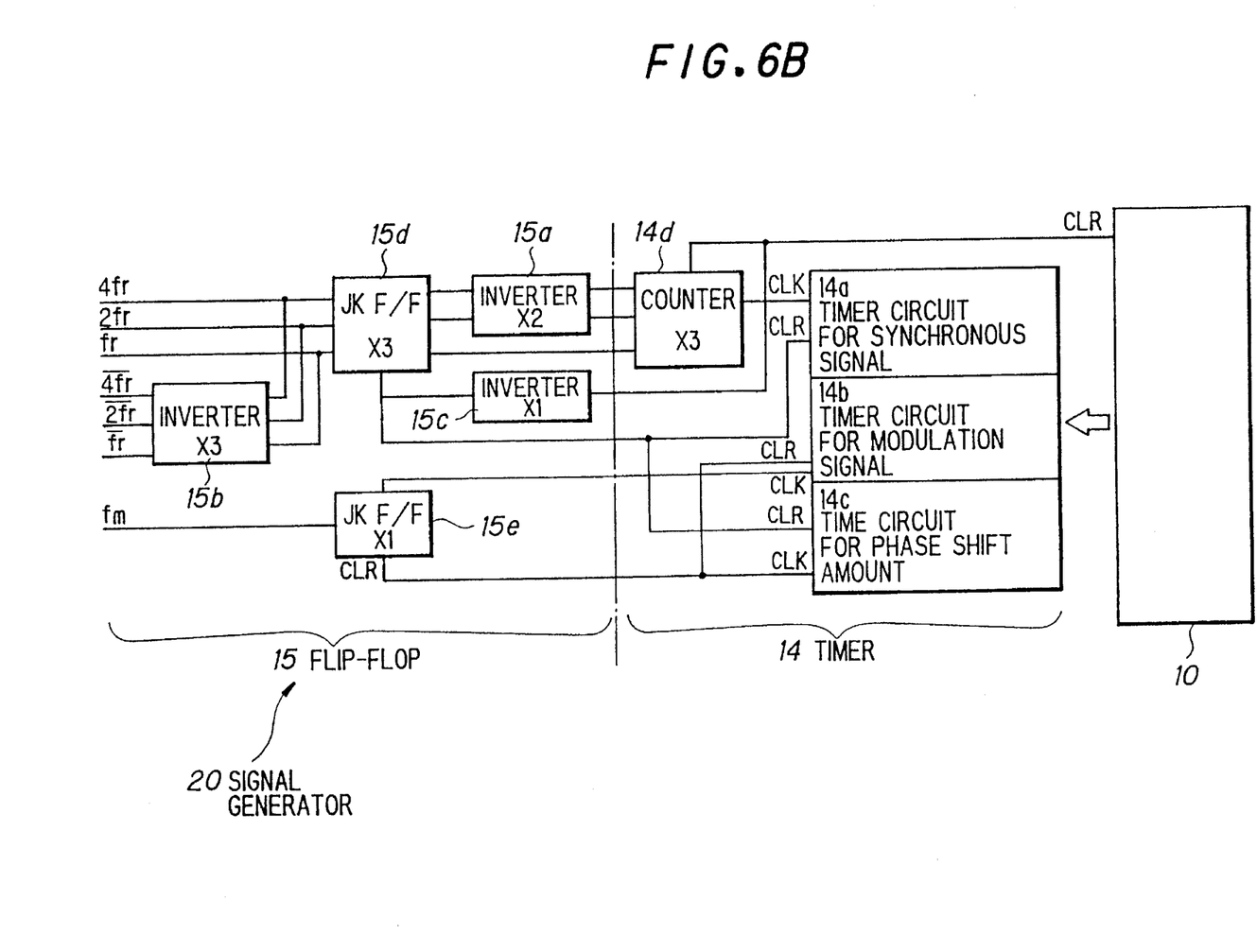
FIG. 6B is a block diagram showing a signal generator in the second preferred embodiment.

As shown in FIG. 6B, the programmable timer 14 is typically composed of first to third timer circuits 14a, 14b and 14c for a synchronous signal, a phase modulation signal, and a control of a phase shift amount by receiving control signals from the CPU 10, and three counter circuits 14d for generating count signals by receiving a clock signal from the timer circuit 14a. The flip-flop 15 comprises first to third JK flip-flops 15d for generating three synchronous signals fr, 2fr and 4fr for a fundamental wave, a duplicate harmonic wave, and a quadruple harmonic wave, and first and second inverters 15a for inverting the counter signals from the counter circuits 14d, third to fifth inverters 15b for inverting the synchronous signals fr, 2fr, and 4fr, and fourth JK flip-flop 15e for generating the phase modulation signal fm, and a sixth inverter 15c for inverting a clear signal from the CPU 10 and the phase modulation signal fm is converted from digital to analog by the D/A converter 17, and the converted phase modulation signal fm is supplied via the low-pass filter 18 to the phase modulator 4.

Figure 7:
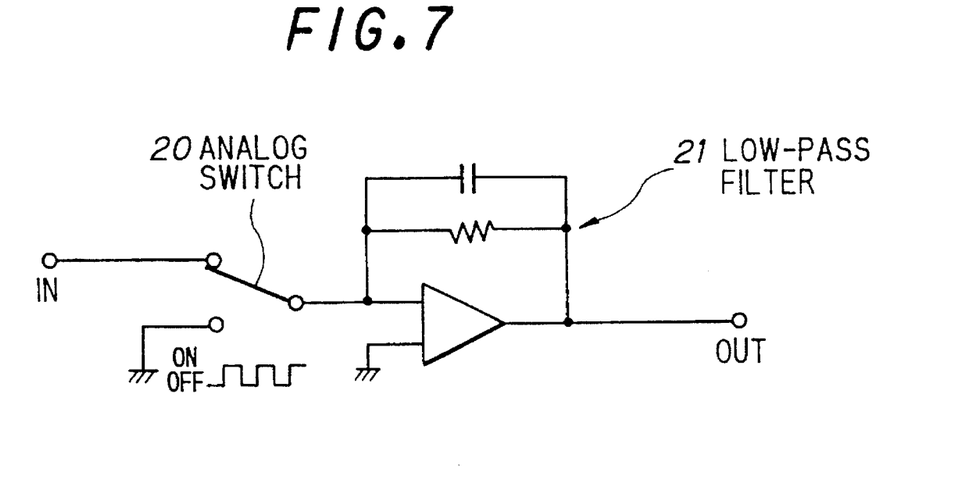
FIG. 7 is an explanatory diagram showing a multiplexer used in the second preferred embodiment.

FIG. 7 shows a common structure of the synchronous detection circuits 81 to 83 which comprises an analog switch 20 and a low-pass filter (integration circuit) 21, wherein the analog switch 20 is turned on and off by a corresponding one of the synchronous signals generated in the flip-flop 15, and a detected signal is supplied via the low-pass filter 21 to the multiplexer 16.

Figure 8:
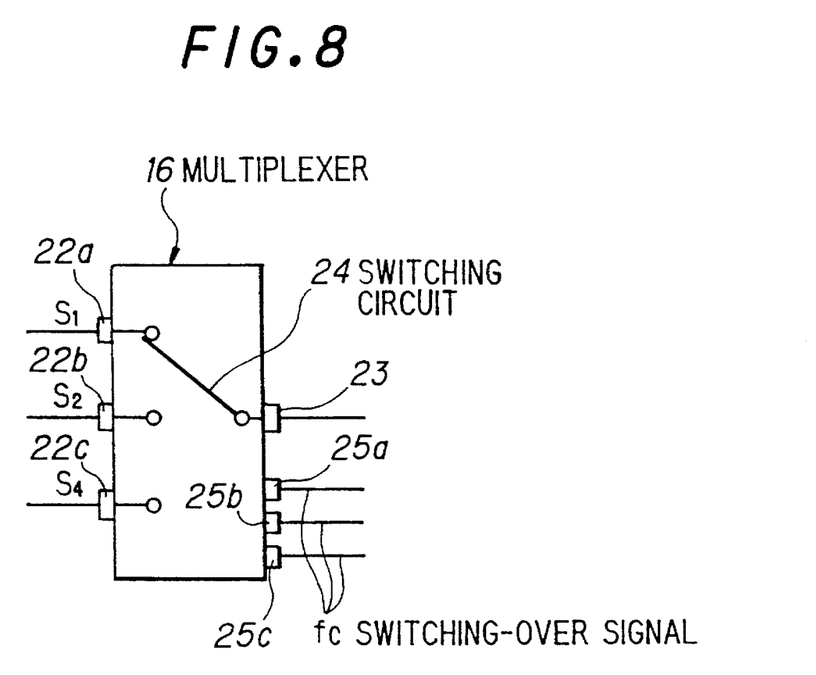
FIG. 8 is an explanatory diagram showing operation of the multiplexer as shown in FIG. 8.

FIG. 8 shows the multiplexer 16 comprising first to third input terminals 22a, 22b and 22c for receiving detected signals $S_1$, $S_2$ and $S_4$ from the first to third synchronous detection circuits 81 to 83, an output terminal 23 for supplying a selected one of the detected signals $S_1$, $S_3$ and $S_4$ to the A/D converter 9, and input terminals 25a, 25b and 25c for receiving a switching-over signal fc from the CPU 10 to turn a switching circuit 24 on one of the input terminals 22a, 22b and 22c.

Figure 9A:
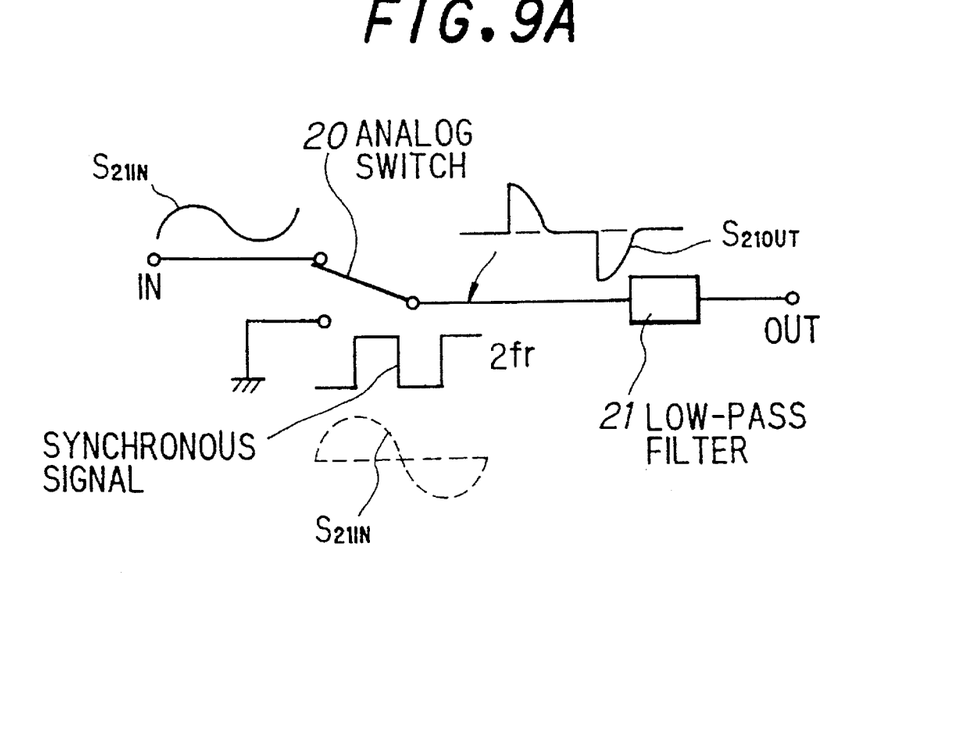
FIGS. 9A and 9B are explanatory diagrams showing a synchronous detection circuit used in the second preferred embodiment.

FIG. 9A shows operation of the second synchronous detection circuit 82 to which an input signal $S_{21Ia}$ and a synchronous signal 2fr of a duplicate harmonic wave is supplied, and from which an output signal $S_{21out}$ is obtained, wherein an integration signal of the output signal $S_{31out}$ is zero in level, because frequencies are not synchronized between the input and synchronous signals $S_{21in}$ and 2fr.

Figure 9B:
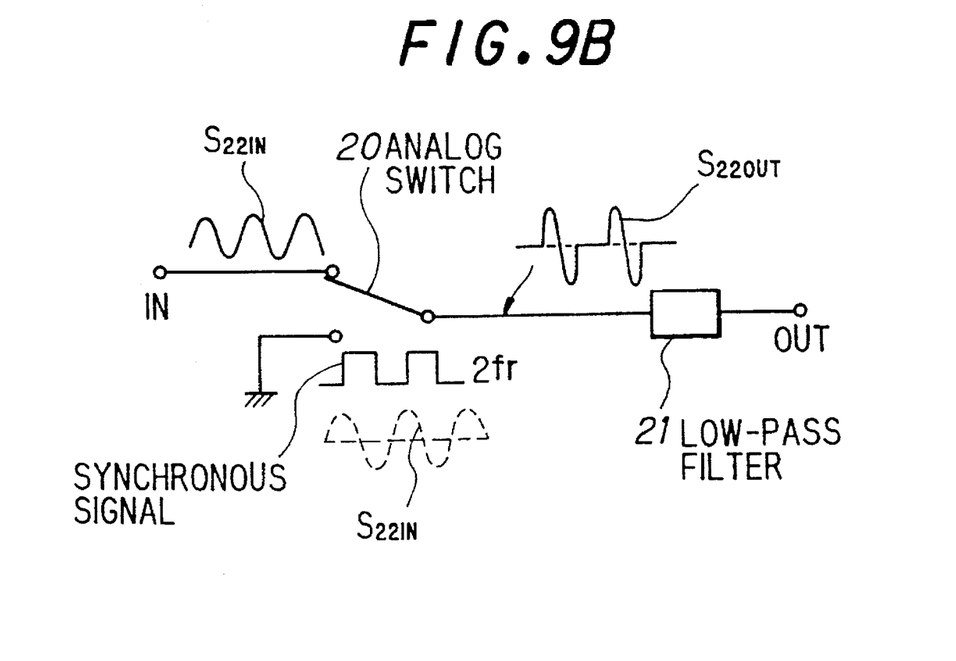

FIG. 9B shows operation of the second synchronous detection circuit 82 to which an input signal $S_{21in}$ and a synchronous signal 2fr of the duplicate harmonic wave is supplied, and from which an output signal $S_{31out}$ is obtained, wherein an integration signal of the output signal $S_{32out}$ is zero in level, because phases are different with $\pi/2$ between the input and synchronous signals $S_{11in}$ and 2fr.

In FIGS. 9A and 9B, the detection of the duplicate harmonic wave component is explained. The same result is observed in the detection of the other frequency components.

In the equations (2) to (4), the values of $S_1$, $S_2$ and $S_4$ are varied, when a phase of the phase modulation signal fm is varied, even if the synchronous signals are fixed in phase.

Figure 10:
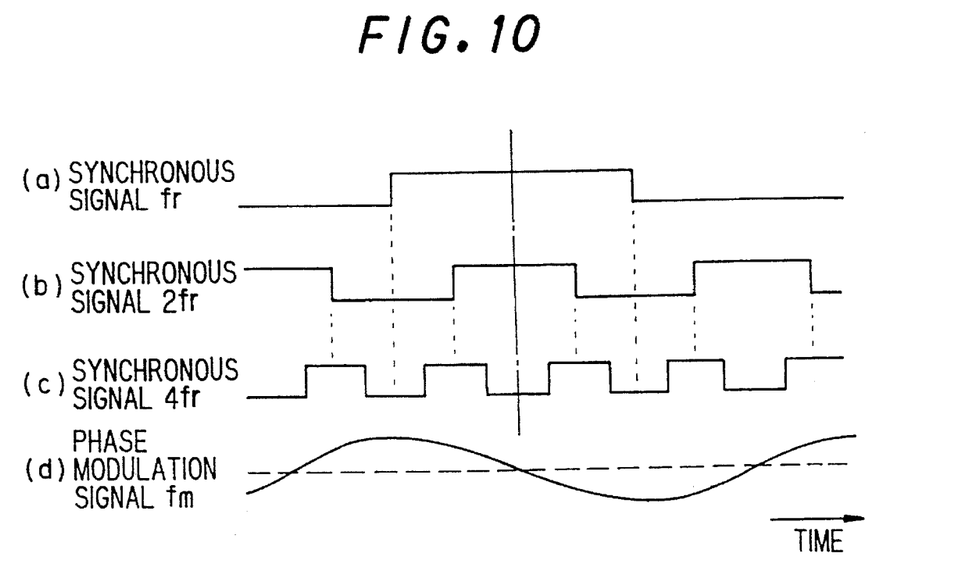
FIGS. 10 is a waveform diagram showing synchronous signals $f_f$, $2f_f$ and $4f_f$ and a phase modulation signal fm in the second preferred embodiment.

FIG. 10 shows the synchronous signals fr, 2fr and 4fr which are fixed in phase, and the phase modulation signal fm which is varied in phase, respectively, in the second preferred embodiment.

Figure 11A:
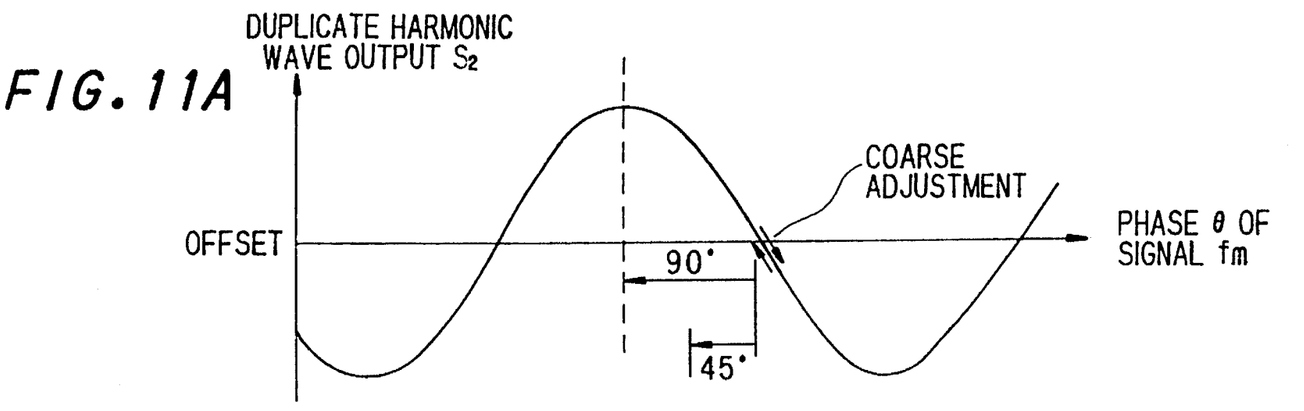
FIGS. 11A and 11B are waveform diagrams showing detected outputs of duplicate and quadruple harmonic waves in the second preferred embodiments.
Figure 11B:
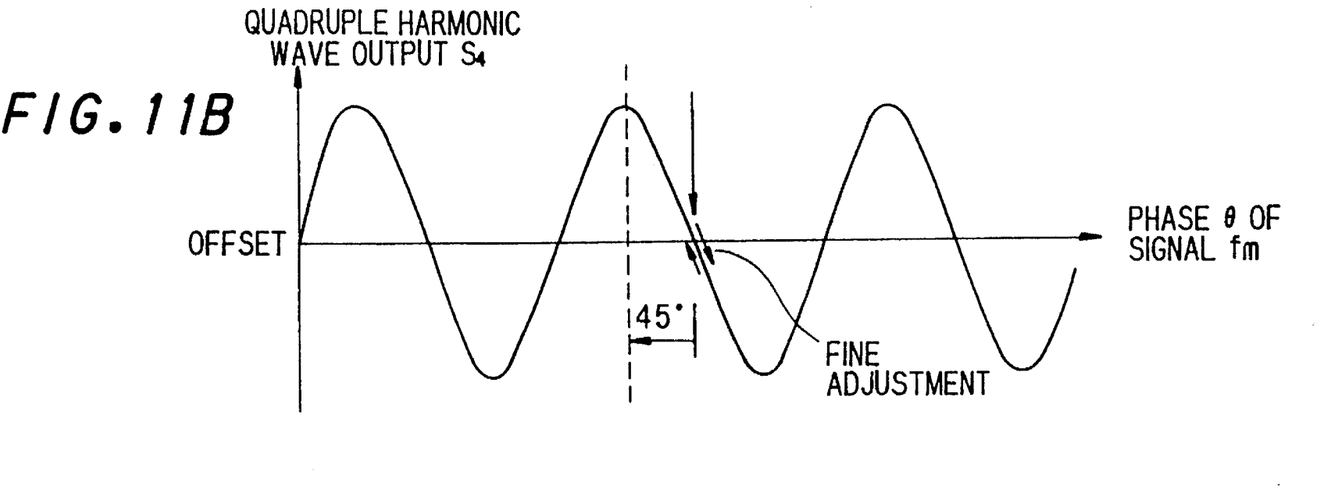

In this assumption, FIGS. 11A and 11B show the relations of the duplicate and quadruple harmonic wave outputs and a phase θ of the phase modulation signal fm on the condition that the sensing loop 5 is not rotated, and the clock-wise and counter clock-wise direction lights of a constant intensity and a constant phase are supplied to the stationary sensing loop 5, while the phase θ of the phase modulation signal fm is varied, so that the first term of the equations (3) and (4) are considered as constant values.

In the phase modulation, the CPU 10 monitors a detected output of the second synchronous detection circuit 82 for detecting the duplicate harmonic wave signal $S_3$, and, at the same time, controls the signal generator 20 to shift a phase of the phase modulation signal fm which is coarsely adjusted, so that the duplicate harmonic wave signal $S_1$ will be zero (offset level) as shown in FIG. 11A. Subsequently, the signal generator 20 is controlled to shift the phase of the phase modulation signal fm in a positive output direction of the duplicate harmonic wave signal $S_3$ by one eighths wavelength (equal to 45 degrees) of the duplicate harmonic wave signal $S_2$. Then, the switching circuit 24 of the multiplexer 16 is turned on the input terminal 22c, so that a detected output of the quadruple harmonic wave signal $S_4$ is monitored by the CPU 10. Simultaneously, the signal generator 20 is controlled to finely shift the phase of the phase modulation signal fm, so that the detected output of the quadruple harmonic wave signal $S_4$ will be zero (offset level). Then, the signal generator 20 is controlled to shift the phase of the phase modulation signal fm in a positive output direction of the quadruple harmonic wave signal $S_4$ by one eighths wavelength (equal to 45 degrees) of the duplicate harmonic wave signal $S_3$ as shown in FIG. 11B.

In this manner, the phase of the phase modulation signal fm is adjusted with a high precision. In the coarse and fine adjustments, the above described zero level (the offset level) is a level equal to output levels of the first to third synchronous detection circuits 81 to 83 in case where the phase modulator 4 is stopped to be driven, or the light source 1 is turned off, wherein a subsequent one of the output levels thereof is successively detected by switching-over the multiplexer 16, so that data thus sampled are supplied via the A/D converter 9 to the CPU 10, in which the data are processed in accordance with the addition and mean value calculation carried out by a program stored in the CPU 10.

In the signal generator 20 comprising the timer 14 and the flip-flop 15, the tamer circuit 14a of the timer 14 generates a clock signal for driving the three counters 14d of the timer 14 to generate count signals, and the JK flip-flop 15e of the flip-flop 15 shifts the phase of the phase modulation signal fm by receiving the clock signal from the timer circuit 14b.

In more specifically, the JK flip-flop 15e for the phase adjustment operates with set and reset states by receiving the clock signal from the timer circuit 14b, while the timer circuit 14c for the control of a phase shift amount continues counting up to a value set by the CPU 10, and, when a counted value of the timer circuit 14c becomes equal to the value set the CPU 10, the JK flip-flop 15e for the generation of the phase modulation signal fm is cleared to precisely control the phase shift amount.

In the second preferred embodiment, a precision of less than 1 degree is obtained in the phase adjustment, when a frequency of the phase modulation signal fm is several tens KHz, and a frequency of the clock signal supplied to the timer 14 is 10 MHz. Consequently, the precision and the reliability of the optical fiber gyro are remarkably enhanced in the second preferred embodiment.

In the second preferred embodiment, the phase adjustment of the phase modulation signal fm is automatically carried cut to shorten a time for the phase adjustment, and a one-phase synchronous detection circuit can be used to make a circuit size small and decrease a fabrication cost and a product cost.

In the seconds preferred embodiment, the synchronous signals fr, 2fr and 4fr may be shifted in phase in place of shifting a phase of the phase modulation signal fm. In such a ease, the three JK flip-flops 15d for the synchronous signals fr, 2fr and 4fr are set and reset by receiving the clock signal and the count signals, while timer circuit 14c for the control of a phase shift amount continues counting up to a value set by the CPU 10, and the JK flip-flop 15e is cleared to precisely control the phase shift amount, when a counted value is equal to the value.

In the first and second preferred embodiments, the coarse and fine adjustments are carried out at the zero-crossing points of the duplicate and quadruple harmonic wave outputs $S_3$ and $S_4$ as shown in FIGS. 11A and 11B. As a result, the precision of the phase adjustment is remarkably increased, because the change rate of the outputs $S_3$ and $S_4$ is maximum at the zero-crossing points as compared to other points. Further, the phase adjustment is correctly carried out, when the offset levels as shown in FIGS. 11A and 11B are set to be approximately a noise level of an electric signal processing system including a power supply, the pre-amplifier 7, the synchronous detection circuits 81 to 83, etc., so that any influence of noise is avoided in the phase adjustment.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. An optical fiber gyro, comprising:

an optical fiber sensing loop for propagating lights in a clock-wise direction and a counter clock-wise direction;

a phase modulator for modulating phases of said lights propagated through said optical fiber sensing loop;

an optical coupler for coupling said lights having propagated through said optical fiber sensing loop to provide a coupled light;

a photodetector for generating an electric signal responsive to said coupled light;

a synchronous detection circuit for detecting said electric signal to provide a detected output, said detected output comprising a fundamental wave component of a phase modulation signal supplied to said phase modulator, an even-number order harmonic wave component, and an orthogonal component obtained in accordance with a shift of said even-number order harmonic wave component by a phase of one quarter period; and means for adjusting a phase relation of said fundamental wave, even-number order harmonic wave, and orthogonal wave components and said phase modulation signal to make a level of said orthogonal wave component zero, and maintaining a mutual phase relation of said fundamental wave, even-number order harmonic wave, and orthogonal wave components to be a predetermined mutual phase relation, wherein:
said synchronous detection circuit, comprises:
a fundamental wave detection circuit for detecting said fundamental wave component;
a duplicate harmonic wave detection circuit for detecting a duplicate harmonic wave component as a first one of said even-number order harmonic wave component;
a quadruple harmonic wave detection circuit for detecting a quadruple harmonic wave component as a second one of said even-number order harmonic wave component; and
an orthogonal component detection circuit for detecting said orthogonal component.

2. An optical fiber gyro, comprising:

an optical fiber sensing loop for propagating lights in a clock-wise direction and a counter clock-wise direction;

a phase modulator for modulating phases of said lights propagated through said optical fiber sensing loop;

an optical coupler for coupling said lights having propagated through said optical fiber sensing loop to provide a coupled light;

a photodetector for generating an electric signal responsive to said coupled light;

a synchronous detection circuit for detecting said electric signal to provide a detected output, said detected output comprising a fundamental wave component of a phase modulation signal supplied to said phase modulator, an even-number order harmonic wave component, and an orthogonal component obtained in accordance with a shift of said even-number order harmonic wave component by a phase of one quarter period; and means for adjusting a phase relation of said fundamental wave, even-number order harmonic wave, and orthogonal wave components and said phase modulation signal to make a level of said orthogonal wave component zero, and maintaining a mutual phase relation of said fundamental wave, even-number order harmonic wave, and orthogonal wave components to be a predetermined mutual phase relation, wherein:
said adjusting means, comprises;
a programmable timer for generating a clock signal of an arbitrary frequency by dividing a frequency of a reference clock signal;
a flip-flop for supplying synchronous signals to said synchronous detection circuit by receiving said clock signal, said synchronous signals each being assigned to a corresponding one of said fundamental wave, even-number order harmonic wave, and orthogonal components;
a shift register for delaying said phase modulation signal to be supplied to said phase modulator; and
a CPU for controlling said programmable timer and said shift register to operate in accordance with control parameters determined by output signals of said synchronous detection circuit.

3. An optical fiber gyro, comprises:

an optical fiber sensing loop for propagating lights in a clock-wise direction and a counter clock-wise direction;

a phase modulator for modulating phases of said lights propagated through said optical fiber sensing loop by receiving a phase modulation signal;

an optical coupler for coupling said lights having propagated through said optical fiber sensing loop to provide a coupled light;

a photodetector for generating an electric signal responsive to said coupled light;

a first synchronous detection circuit for detecting a fundamental wave component of said phase modulation signal by receiving said electric signal;

a second synchronous detection circuit for detecting a duplicate harmonic wave component by receiving said electric signal;

a third synchronous detection circuit for detecting a quadruple harmonic wave component by receiving said electric signal;

a signal generator for generating synchronous signals used for detections in said first to third synchronous detection circuits, and said phase modulation signal to drive said phase modulator; and a CPU for calculating a rotative angular velocity of said optical fiber sensing loop in accordance with at least one of output signals of said first to third synchronous detection circuits;

wherein said CPU controls said signal generator to shift a phase of said phase modulation signal, thereby making a level of said duplicate harmonic wave component zero, and to subsequently shift said phase of said phase modulation signal in a positive output direction of said duplicate harmonic wave component by one quarter wavelength of said duplicate harmonic wave component.

4. The optical fiber gyro as claimed in claim 3, whereinL
said CPU controls said signal generator to adjust said phase of said phase modulation signal, thereby making said level of said duplicate harmonic wave component zero, to subsequently shift said phase of said phase modulation signal in a positive output direction of said duplicate harmonic wave component by one eights wavelength of said duplicate harmonic wave component, then to adjust said phase of said phase modulation signal, thereby making a level of said quadruple harmonic wave component zero, and to finally shift said phase of said phase modulation signal in said positive output direction by said one eighths wavelength.

5. The optical fiber gyro as defined in claim 3, wherein:

said first to third synchronous detection circuits set said level of zero to be a noise level of an electric signal processing system including a power supply, and said first to third synchronous detection circuits.

6. The optical fiber gyro as defined in claim 3, wherein:

said signal generator, comprises:

a programmable timer for generating a clock signal under control of said CPU; and a set of flip-flops for generating first to third synchronous signals for said first to third synchronous detection circuits and said phase modulation signal by receiving said clock signal from said programmable timer.

7. The optical fiber gyro as defined in claim 6, wherein:

said programmable timer, comprises:

first to third timer circuits for a synchronous signal generation, a phase modulation signal generation, and a phase shift amount control;

wherein said third timer circuit counts up to a value set by said CPU, and generates a clear signal for said phase modulation signal at a time when a counted value of said third timer is equal to said CPU-set value.

* * * * *